C. C. REED.
PLOW.
APPLICATION FILED NOV. 7, 1905.
1,162,401.
Patented Nov. 30, 1915.
3 SHEETS—SHEET 3.
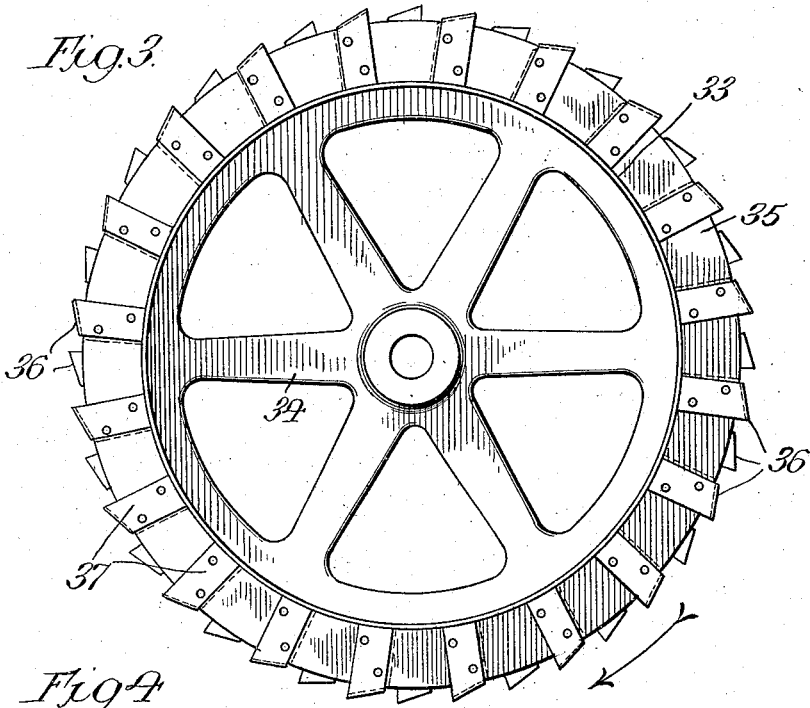
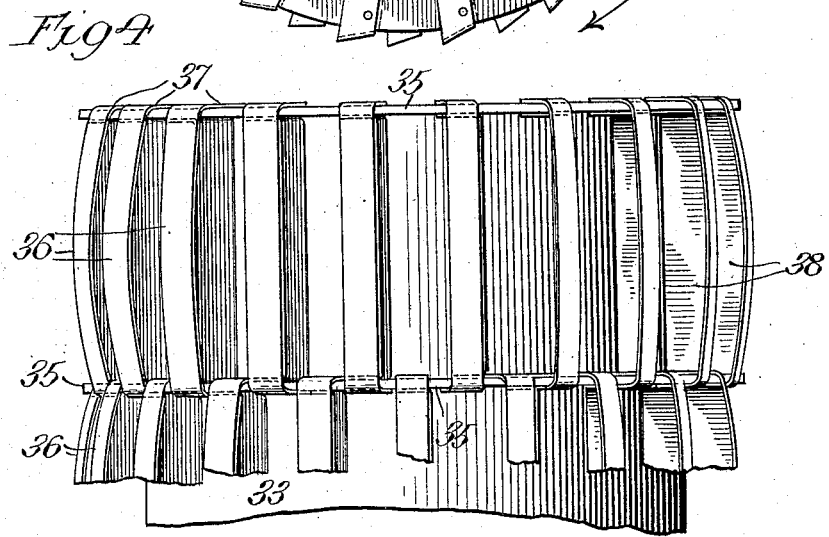
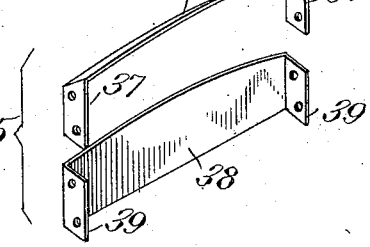
Witnesses:
Edw. P. Barrett
Louis B. Erwin
Inventor
Chase C. Reed
By Rector & Hibben
His Atty's

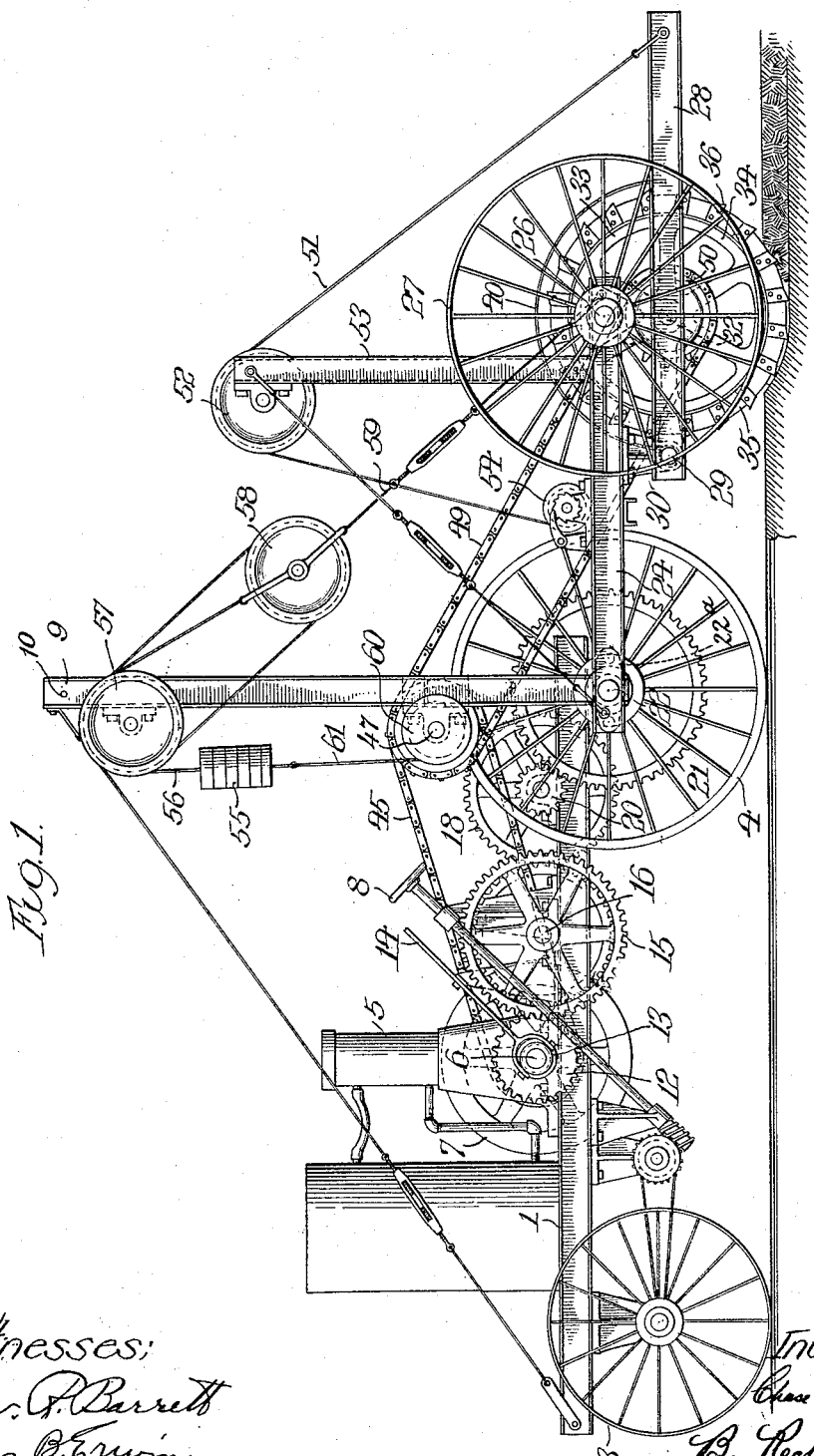

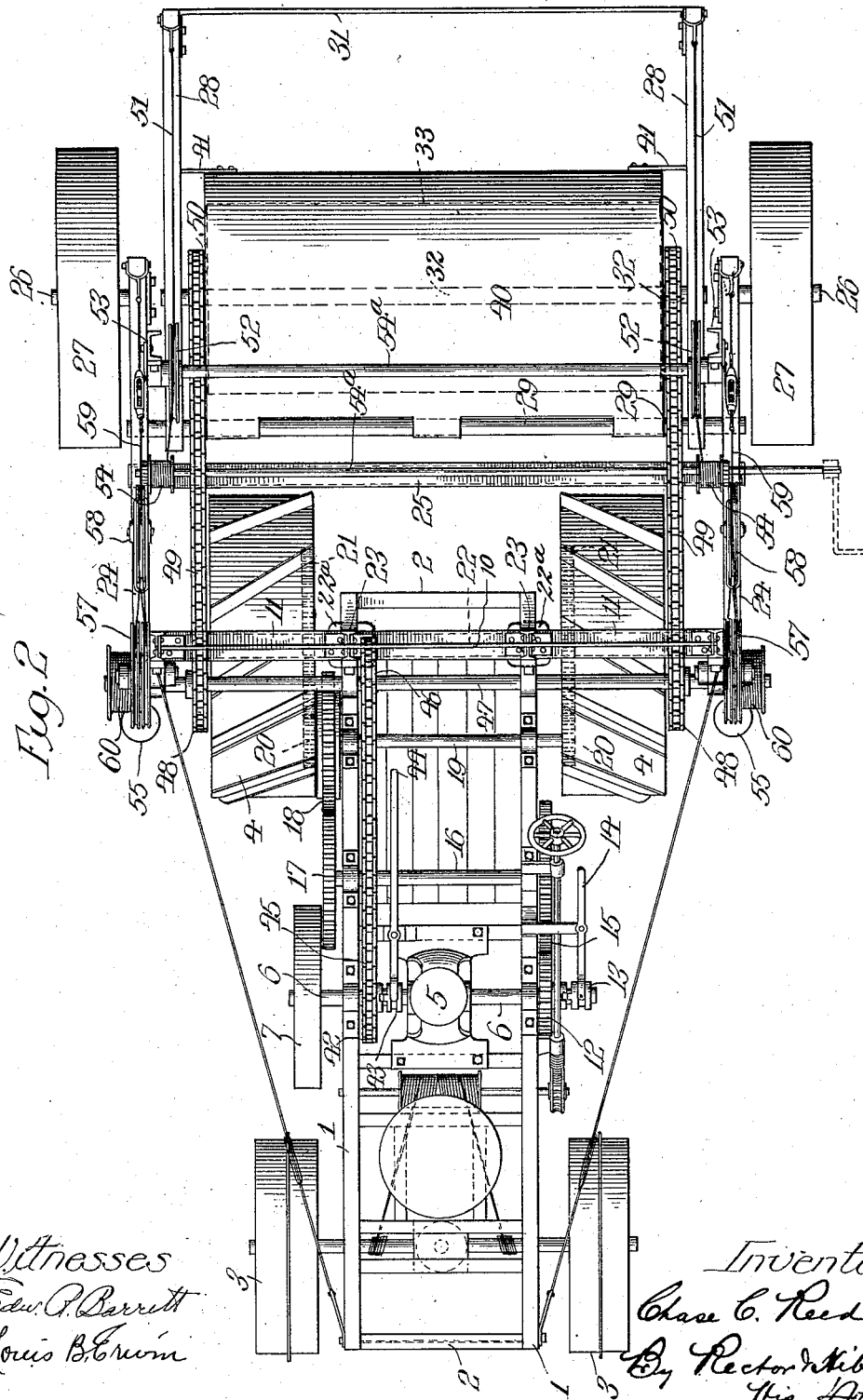

UNITED STATES PATENT OFFICE.

CHASE C. REED, OF ELMORE, OHIO, ASSIGNOR OF ONE-HALF TO JOHN N. MAGEE, OF TOLEDO, OHIO.

PLOW.

1,162,401. Specification of Letters Patent. Patented Nov. 30, 1915.

Application filed November 7, 1905. Serial No. 286,229.

*To all whom it may concern:*

Be it known that I, CHASE C. REED, a citizen of the United States, residing at Elmore, Ottawa county, Ohio, have invented certain new and useful Improvements in Plows, of which the following is a specification.

My invention relates to plows and the object thereof is to provide a machine capable of performing all of the usual operations in tilling the soil such as the plowing proper, harrowing and rolling, with the result that a single machine is capable of performing said functions at a single operation. In the present instance I attain this end by means of a machine having a cylinder or wheel provided with knives digging into the ground and adapted to pulverize the soil and to throw and deposit the soil behind the wheel.

My machine is arranged to be operated by draft or by power, although in the present instance I have chosen to illustrate my invention as driven by a gasolene engine mounted in the main frame of the machine.

The various features of advantage and utility in my machine will be apparent from the description hereinafter given.

In the drawings Figure 1 is a side elevation of my machine; Fig. 2 a plan view thereof; Fig. 3 an end elevation of the plow cylinder on a scale larger than that employed in Figs. 1 and 2; and Figs. 4 and 5 detailed views of portions of the plow cylinder.

Referring to the present embodiment of my invention as herein illustrated, the machine is provided with a main frame composed of parallel side bars 1, 1 connected at their opposite ends by cross or tie bars 2, 2. At its forward end the main frame is supported by suitable wheels 3, 3 and at its rear end by traction wheels 4, 4. The main frame also carries the power mechanism for driving itself and also for driving the plow and in the present instance such power mechanism consists of a gasolene engine 5 provided with an engine shaft 6 and fly wheel 7. The machine is provided with steering mechanism controlled by a steering wheel 8 but as such mechanism is well-known the same need not be described.

At the rear end of the main frame is arranged an upright frame composed of two parallel bars or beams 9 connected together near their top by tie bars 10 and secured at their lower ends to bars 11 extending laterally from the side bars 1 of the main frame. This vertical frame is arranged to support the driving mechanism for the plow and also raising and lowering mechanism as hereinafter described.

Referring to the operating or driving connections for the traction wheels, the same consists of a train of gears arranged and coöperating in the following manner: Upon the engine shaft 6 is loosely mounted a pinion 12 arranged to be operatively connected with its shaft by means of the clutch 13 adapted to be shifted by means of the lever 14. This pinion meshes with a gear 15 secured to one end of a counter-shaft 16 journaled on the main frame and having at its other end a similar gear 17 which latter in turn meshes with a compensating or equalizing gear 18. This equalizing gear is secured to a cross-shaft 19 also journaled in the main frame and carrying at its opposite ends pinions 20. These pinions in turn mesh with gears 21 secured in suitable manner to the traction wheels 4, with the result that when the clutch 13 is properly shifted the power of the engine is transmitted to the traction wheels. The traction wheels 4 are mounted upon an axle or shaft 22 which in the present instance is journaled in hangers or boxes 22ª at the lower ends of the bars 9 of the vertical frame and also at intermediate points below the side bars 1, 1 of the main frame. If desired this vertical frame may be strengthened by means of vertical tie bars or rods 23 connecting with the side bars 1, 1 of the main frame as illustrated in Fig. 2.

Extending rearwardly of the main frame of the machine and pivoted to the latter in suitable manner is a supplemental frame composed of two parallel and longitudinal bars 24 which in the presetn instance are pivoted at their forward ends upon the main axle or shaft 22 of the traction wheels although as will be obvious such supplemental frame may be pivoted more directly upon the main frame and not through the medium of the axle 22. This supplemental frame also comprises a cross-bar 25 connecting said side bars 24. These side bars at their rear ends are provided with laterally extending short axles 26 on which are mounted the idler wheels or ground wheels 27 which run freely upon the ground and serve merely to preserve the cutting depth of the plow as will be apparent from the description hereinafter given.

Extending rearwardly of the supplemental frame is a third frame which may be termed the plow frame, or cutter frame, which is pivotally connected at its forward end to said supplemental frame. In the present instance the plow frame comprises parallel bars 28 secured at their forward ends to the transverse rod or shaft 29 which is journaled in hangers or bearings 30 depending from the side bars 24 of the supplemental frame. By preference the rear ends of the bars 28 are connected together by a tie rod 31.

In the plow frame at points intermediate the length of its side bars 28 is mounted a transverse rod or shaft 32 on which is mounted or secured the plow. As illustrated more particularly in Figs. 1, 3 and 4 this plow comprises, in the present instance, a cylinder or shell 33 provided at its ends and also intermediate its length with a series of spiders 34. Projecting laterally from the cylinder is a series of rings 35 of suitable number according to the length of the cylinder and adapted to form points of attachment for the knives or knife blades, each of which consists of a blade 36 having right-angled ends 37, which ends extend or lap over adjacent rings, such blade being preferably slightly convexed for the sake of rigidity and to prevent buckling which might possibly occur in case the knives were straight. The backing of each knife consists of a plate 38 having right-angled ends 39 which fit between adjacent rings. In practice the knives and their backings are secured to the rings by bolts and in the present instance the same bolts secure the knives and the backings in place by passing through the ends 37 and 39 thereof respectively.

By preference a curved shield 40 is arranged over and adapted to partially envelop the plow, such shield being supported at its front end on the shaft or rod 29 and at its rear end to the side bars 28 by means of the strips 41.

For the purpose of driving the plow the following operating connections are employed in the present instance: Referring to Figs. 1 and 2 the engine shaft is provided with a sprocket wheel 42 loosely mounted thereon but arranged to be operatively connected therewith by means of a clutch 43 having a shifting lever 44. This driving sprocket wheel transmits motion through the sprocket chain 45 to a sprocket wheel 46 secured to a transverse shaft 47 extending from side to side of the machine. This sprocket wheel 46 has a compensating or equalizing arrangement the same as the well-known equalizing gear for the purpose of transmitting the motion equally at both ends of the shaft. Near its opposite ends the shaft 47 is provided with sprocket wheels 48 connected by means of sprocket chains 49 with sprocket wheels 50 secured to the shaft 32 of the plow. It is now evident that when the clutch 43 is in engagement with the hub of the sprocket wheel 42 the plow cylinder will be rotated, the train of gearing being such that a very rapid speed is imparted to such cylinder.

In operation the knives cut a swath in the ground and the soil so cut is carried upwardly and around the wheel by means of the buckets associated with the knives and such soil, which is thoroughly pulverized in the operation of cutting and carrying, is discharged at the rear of the wheel or cylinder. Owing to the rapid rotation of the cylinder and its knives the soil is practically pulverized and the same is discharged evenly upon the ground in the rear of the cylinder, with the result that no subsequent harrowing or rolling are required. Thus my invention is a combined plow, harrow and roller so far as results are concerned in the tillage of the soil.

It will be understood that the ground wheels 27 are in the nature of idlers inasmuch as they run idly on the ground and merely serve to support the supplemental frame which is held in a fixed parallel relationship with the ground. It results from this construction and provision of ground wheels that the depth of cut of the plow may be adjusted so as to make a deeper or shallower cut as may be required or desired. In the present instance I provide a suitable raising and lowering device which as shown in Figs. 1 and 2 consists of a pair of cables 51 fastened at one end to the rear ends of the plow frame and extending over pulleys 52 supported at the upper end of a vertical frame composed of up-rights or vertical bars 53. The forward ends of these cables coöperate with windlasses 54 mounted upon the supplemental frame operated in unison by reason of the cross-shaft 54ª. By these means the plow may be adjusted up or down for varying the depth of cut inasmuch as the plow frame, in which the plow is mounted, is pivotally connected to the supplemental frame. When the windlasses are rotated in a direction to wind up the cable, the plow frame is elevated as to its rearward end and the plow thereby moved upwardly whereas in case the cables were let out, the plow would be lowered for a deeper cut.

For the purpose of counter-balancing the weight of the plow frame and its associated parts, I provide a counter-balancing device which consists of two series of weights 55 coöperating with cables 56 extending over double sheaves 57 and 58, the lower sheaves being connected by cable connection 59 with the rear end of the supplemental frame. If desired the entire supplemental frame and plow may be raised to an inoperative position when it is desired to move or transport the machine from one locality to another without plowing and to accomplish this result the counter-weights may be lowered in any suitable manner and held in such lowered position. Moreover if desired this lowering may be accomplished by the power of the engine itself as illustrated in Figs. 1 and 2 wherein it is seen that the shaft 47 is provided at its ends with winding drums 60 which have cables 61 arranged to be attached to or detached from the counterweights 55. It will be understood that when such power connection is made, only the clutch 43 is operative, the other clutch 13 being inoperative with the result that no power will be transmitted to the traction wheels but the power will be transmitted alone through the other train of gearing including the shaft 47. Although in this particular operation the plow will rotate yet no harm will result inasmuch as the plow is being simultaneously raised from the ground and the machine is not being advanced.

Although in the present instance the cylinder is arranged to rotate in the direction of the arrow as indicated in Fig. 3 and although such is the preferred construction and arrangement, yet it is obvious that the cylinder might be rotated in the opposite direction after proper changes are made in the character or direction of the knives. Furthermore it is desirable that the cylinder and traction wheels have such a relationship as that the traction wheels will always be on solid ground instead of one wheel on solid ground and the other wheel on plowed ground and to this end one edge of the cylinder should coincide with or overlap the corresponding edge of its adjacent traction wheel. If, however, the cylinder should be of a length less than the distance between the outer edges of the two traction wheels, then one edge of the cylinder must coincide with the similar edge of its adjacent traction wheel. Moreover the construction and arrangement of my machine is such that practically all the weight is carried on the traction wheels and as little as possible is put on the ground or gage wheels. One of these wheels of course travels on the plowed ground, consequently it is desirable that such wheel be relieved as much as possible of weight or pressure so as not to pack the plowed ground.

As clearly indicated in the drawings, the gage or ground wheels are located adjacent and beyond the ends of the plowing cylinder with their axes in the same vertical plane as the axes of such cylinder, which arrangement results in several important advantages, chief among which may be mentioned the fact that a more accurate gage adjustment as well as a more uniform depth of cut may be obtained, for it is obvious that the depth to which the machine is adjusted is maintainable regardless of the character of the ground inasmuch as the effect of any inequalities in the ground surface is at once communicated to the plowing cylinder, such cylinder rising and falling in perfect unison with the gage wheels. It is evident this result would be impossible with the gage wheels and cylinder placed in any other relationship. Moreover, this arrangement has an additional advantage in that less movement of the parts is necessary to obtain the same degree of adjustment of the cylinder.

While the present recommended construction of my machine involves the employment of three frames to-wit, the main frame, supplemental frame, and plow frame or cutter frame, it will be understood that in the broad aspect of my invention the employment of this number of frames and the particular disposition and arrangement thereof are not essential. For instance the plow frame might be connected with or form a part of the main frame and the plow or cylinder, in such event, provided with means for raising and lowering the same vertically for deeper or shallower plowing, or the plowing frame may be dispensed with and the plow or cylinder mounted in vertically adjustable bearing boxes or the like suspended or connected with the supplemental frame. Also, while the knives or knife blades are herein shown as parallel with the axis or shaft of the cylinder yet they may, if desired, be set at a suitable angle.

I claim:

1. A plow comprising a frame, an engine mounted thereon, ground and traction wheels mounted in said frame, said traction wheels being arranged to be operatively connected with the engine, a supplemental frame pivoted on said main frame, a plow frame pivoted to said supplemental frame, a rotary cutter mounted in said plow frame, and gage wheels mounted on said supplemental frame.

2. A plow comprising a frame, an engine mounted thereon, ground and traction wheels mounted in said frame, said traction wheels being arranged to be operatively connected with the engine, a supplemental frame pivoted on said main frame, a plow frame pivoted to said supplemental frame, a rotary cutter mounted in said plow frame, gage wheels mounted on said supplemental frame, and means for raising and lowering said plow frame with respect to said supplemental frame.

3. A plow comprising a frame, an engine mounted thereon, ground and traction wheels mounted in said frame, said traction wheels being arranged to be operatively connected with the engine, a supplemental frame pivoted on said main frame, a plow frame pivoted to said supplemental frame, a rotary cutter mounted in said plow frame, gage wheels mounted on said supplemental frame, and hoisting means connected with said supplemental frame to raise and lower the latter with respect to said first mentioned frame.

4. A plow comprising a traveling main frame, a supplemental frame pivoted thereto, ground wheels mounted in said supplemental frame, a plow frame pivoted upon the supplemental frame, a cylinder having cutters and mounted to rotate in the plow frame, and having its axis in substantially the same vertical plane as the axes of the ground wheels, means arranged to counterbalance said supplemental and plow frames and also arranged to raise and lower such latter frame and the plow, and means for rotating the cylinder.

5. A plow comprising a traveling main frame, a supplemental frame pivoted thereto, ground wheels mounted in said supplemental frame, a plow frame pivoted upon the supplemental frame, a cylinder having cutters and mounted to rotate in the plow frame and having its axis in substantially the same vertical plane as the axes of the ground wheels, means arranged to counterbalance said supplemental and plow frames and also arranged to raise and lower such latter frame and the plow, said means consisting of sheaves and cables connected with the supplemental frame, counter-weights, and winding drums arranged to be connected with said cables.

6. The combination of a main frame, a supplemental frame pivoted thereto, a plow frame pivoted to the supplemental frame, a rotatable plowing cylinder mounted in the plow frame, means for rotating the cylinder, gage wheels mounted in said supplemental frame and adjacent the ends of the cylinder, means coöperating with the plow frame for raising and lowering such frame to vary the depth of cut, and means coöperating with both the supplemental and plow frames for raising or lowering them with respect to the main frame.

7. The combination of a main frame, a supplemental frame pivoted thereto, a plow frame pivoted to the supplemental frame, a rotatable plowing cylinder mounted in the plow frame, means for raising and lowering the plow frame with respect to the supplemental frame comprising cables 51 connected at one end with the rear end of the plow frame, and windlasses arranged to operate in unison and connected with the other ends of said cables.

8. The combination of a main frame, a supplemental frame pivoted thereto, a plow frame pivoted to the supplemental frame, a rotatable plowing cylinder mounted in the plow frame, means for raising and lowering the plow frame with respect to the supplemental frame comprising cables 51 connected at one end with the rear end of the plow frame, and windlasses arranged to operate in unison and connected with the other ends of said cables and means for counterbalancing both the supplemental and plow frames comprising a pair of cables 59 secured at one end to the supplemental frame, pairs of double sheaves 57 and 58 connected with the cables 59, and a pair of counterweights 55 coöperating with said sheaves.

CHASE C. REED.

Witnesses:
 LOUIS B. ERWIN,
 S. E. HIBBEN.

Copies of this patent may be obtained for five cents each, by addressing the "Commissioner of Patents, Washington, D. C."